United States Patent [19]

Werner

[11] Patent Number: 5,352,957

[45] Date of Patent: Oct. 4, 1994

[54] APPLIANCE CONTROL SYSTEM WITH PROGRAMMABLE RECEIVERS

[75] Inventor: Walter Werner, Dornbirn, Austria

[73] Assignee: Zumtobel Aktiengessellschaft, Austria

[21] Appl. No.: 861,839

[22] PCT Filed: Jul. 11, 1990

[86] PCT No.: PCT/EP90/01133
§ 371 Date: Jun. 19, 1992
§ 102(e) Date: Jun. 19, 1992

[87] PCT Pub. No.: WO91/10276
PCT Pub. Date: Jul. 11, 1991

[30] Foreign Application Priority Data

Dec. 21, 1989 [EP] European Pat. Off. ........ 89123678.8
Jan. 1, 1990 [EP] European Pat. Off. ........ 90100465.6

[51] Int. Cl.$^5$ ............................................. G05F 1/00
[52] U.S. Cl. .................................. 315/291; 315/313; 315/314; 315/316; 315/363; 340/310 A; 340/310 CP
[58] Field of Search ............... 315/313, 314, 316, 320, 315/324, 362, 363, 291, 293; 307/38, 40, 3; 340/310 A, 310 CP, 288, 320

[56] References Cited

U.S. PATENT DOCUMENTS

| 4,200,862 | 4/1980 | Campbell et al. | 307/3 X |
| 4,347,575 | 8/1982 | Gurr et al. | 364/492 |
| 4,396,844 | 8/1983 | Miller et al. | 307/40 X |
| 4,808,841 | 2/1989 | Ito et al. | 307/11 |

FOREIGN PATENT DOCUMENTS 0267528  8/1986  European Pat. Off. .
8606890  9/1985  World Int. Prop. O. .

OTHER PUBLICATIONS

Patent Abstract of Japan, vol. 9, No. 266 (E-352) (1989), JP-A-60-112336.
Kemp, I., "Stage Lighting System", *Wireless World*, vol. 90, No. 1583: pp. 33-36 (1984).

*Primary Examiner*—Robert J. Pascal
*Assistant Examiner*—Reginald A. Ratliff
*Attorney, Agent, or Firm*—Scully, Scott, Murphy & Presser

[57] ABSTRACT

A control system for a plurality of appliances in distributed arrangement, in particular lighting fittings, having a command generator (1), a receiver (10) associated with each appliance (40), a control line (2) which connects the command generator (1) to each receiver (10), and a first memory (20, 23) in each receiver (10) in which an operational address (A2) for the associated appliance (40) can be stored. A control part (30, 50) is provided in each receiver (10) by means of which the appliance (40) associated therewith (30, 50) can be controlled by the command generator (1) if it (30, 50) has first been activated by selection of the operational address (A2) of the appliance (40) associated therewith. The control system for appliances that are to be in distributed arrangement is intended to make a particularly simple initiation of operations possible. This is achieved by the fact that the operational address (A2) in the first memory (20) of each receiver (10) can be written-in by electrical signals, and that an electrically readable second memory (21) is provided which contains a receiver-specific original address (A1).

5 Claims, 3 Drawing Sheets

START

1. TO <ALL> <IDENTIFY> END;

2. I AM <PRODUCTION NUMBER> END;

3. TO <PRODUCTION NUMBER><SWITCH ON> END;

4. TO <PRODUCTION NUMBER><ROOM-GROUP-APPLIANCE> END;

5. TO <ROOM-GROUP-APPLIANCE> <LIGHT INTENSITY V2> END;

6. = 2.

7. = 3.

. . .
. . .
. . .

END.

APPLIANCE CONTROL SYSTEM WITH PROGRAMMABLE RECEIVERS

The invention relates to a control system or several appliances in distributed arrangement, in particular lighting fittings, according to the preamble of claim 1. It further relates to a method for bringing into operation a control system according to claim 1.

In houses or larger buildings it is necessary that appliances arranged in several rooms, in particular light sources, can not only be switched on and off or have the brightness adjusted by switches and/or dimmers arranged in the relevant rooms but that these functions can be remotely controlled via central control devices. Remote control is carried out by means of so-called control centres or command generators which can address and control with commands the appliances arranged decentrally in several rooms and connected to a common supply system, usually the 220 V domestic supply. In this way central monitoring and control, if appropriate from several control centres, of all decentrally arranged appliances is possible. The term "appliance" is used to designate any electrically supplied elements, for example incandescent lamps, gas discharge lamps, electric motors or heating systems. An electric motor may, for example, be coupled to a shutter/louvre or a door opening and shutting mechanism.

A control system of the kind mentioned in the introduction is known, for example, under the designation Timac X-10. In a control system of this kind control points for transmitting and device points for receiving are connected to the domestic electricity supply. Operational addresses are attributed to the individual device points with two interconnecting setting wheels provided at each device point, of which the first setting wheel has 16 digits and the second setting wheel carries the letters A to P. A house code (A-P) for the address is set by the second setting wheel, the device point number (1 ... 16) for the address is set by the first setting wheel. For each device point the two setting wheels are set by the user to a particular combination, for example B10 or P1. This combination forms the control address for the relevant device point. In this way, after installation of or attachment of a device point a single specific address can be set locally for each appliance which comprises said two components. To control a certain number of appliances a control point has the same number of control keys, each control key being set to an operational address corresponding to a device point via two setting wheels or setting keys in the control point. In this way, by pressing a control key, the device point (with connected appliance), of which the set operational address corresponds to the address associated with a respective control key, can be remote-controlled from the control point.

Dialogue remote-control switches are also known from the same system which include the device point receiver as described above and at the same time a state information transmitter. They provide the combination of remote-controllability and local control of the appliances by means of conventional switches or sensor keys. If, with a dialogue remote-control switch of this kind, a lamp is switched on or off locally, this dialogue remote-control transmits status information to the central control point that is now informed of the new operational state of the appliance.

The object of the invention is to provide an improved control system for distributed appliances that can be brought to an operational condition in a particularly simple manner.

This object is achieved in a control system of the kind mentioned in the introduction by the characterising features set forth in claim 1.

Alternatively this object can be achieved with a control system of the kind mentioned in the introduction by the characterising features set forth in claim 22.

A method for bringing into operational condition a control system according to the invention, having its own inventive merit, is set forth in the steps a) to e) according to claim 10.

A significant object of the invention is to simplify and simultaneously improve the selectability of the individual, decentrally arranged receivers, or the appliances associated therewith, by a central command generator. The replacement of the mechanical memory known from the state of the art in the form of setting wheels by an electrically writable memory medium allows the successive allocation of operational addresses to each receiver directly through the central command generator. The associated effect of the invention lies in the setting and bringing into operational condition of the system, after installation of the system, without address-setting being necessary before installation. With this it is particularly advantageous that for mounting the individual appliances—that need no longer to be set by setting wheels—at their decentralised locations semi-qualified or unqualified personnel can be employed.

According to the method in claim 10 the association of the operational address and original address, in accordance with the invention, is brought about in a short time only after complete installation either by the user himself or by one qualified person.

A further object, that of also being able to alter as desired the operational addresses of the appliances after they have been mounted without needing adjustment work locally, i.e. manipulation directly on the appliance, is also pursued by the invention. The allocation of operational addresses from the command generator enables, according to the invention, free selection and equally free subsequent alteration of the selected operational addresses for the individual receivers or their associated appliances. Adjustment at each appliance itself is dispensed with. According to the invention it is therefore unnecessary for someone to climb a ladder and make mechanical adjustments on an appliance, in particular on a lighting fitting mounted to the ceiling. All setting and operating functions can be carried out according to the invention from the command generator.

A further significant object of the invention is to provide a control system that can be simply adapted or that self-adapts (autoadaptation) to any combination of appliances. With this, according to advantageous further development, individual appliances are specified, i.e. their type is identified, by their characterising addresses. A command generator according to the invention can, without further adjustment, automatically recognise connected devices and remote-control them accordingly. For example it can automatically be recognised whether a motor or a lighting device is connected. Automatic recognition of installed lighting power and the type of light source, e.g. gas discharge lamp, halogen radiator, arc lamp or normal incandescent lamp, is also made possible according to the invention.

The simplification of installation aside from the simplification and improvement of addressing is a further significant consideration for control systems in large buildings. Here, there is a particularly large number of lighting fittings and/or appliances for which number simplified installation is particularly desirable. With the invention both the time spent and the technical qualifications of the persons doing the installing are reduced to a minimum. The work needed to connect a remote-controllable appliance is reduced to the connection of a three-core supply line (live, neutral, earth) and (if a common control and supply line is not provided as according to claim 5) the connection of a further two-core control line or of an infrared receiver. The system is now already completely ready to be brought into operation; further local setting work is dispensed with.

The immediate recognition and identification of an appliance just mounted, made possible according to the invention by means of an original address, formed by a production number according to claim 5, as a rule requires a relatively long original address. For the operation of a particularly large number of appliances the continued usage of this address is disadvantageous and it can therefore be replaced by a more suitable operational address which, aside from being short, ensures additional improved operation of the system. This improved operation is afforded by the collective commands or group controls; certain commands are then not only received and carried out by an individual receiver with associated appliance but simultaneously by a plurality of appliances. This shortens reaction times and simplifies the control and operation of the system.

Finally, the invention makes it possible to expand the system in any way at any time in that additional appliances are merely connected to an existing system. The newly added appliances can, after mounting, be identified in the simplest manner by the command generator and either be associated with an already existing group or sub-group or new groups can be allocated to them.

In more economical implementations the electrically readable second memory comprises a mechanical memory element, for example a mechanical jumper or DIL switch. This forms a binary digital word, for example of 6, 8 or 16 bits, by which the associated appliance can be recognised. Recognition can be restricted in accordance with claim 21 or in accordance with claim 5 to a production number. It can however also involve a further appliance-specific characterising address on the basis of which the type of appliance can be identified for the command generator. An appropriate switch setting of the miniature switch may be set in advance during manufacture of the receiver or device units.

In further advantageous development both the operational address and the receiver-specific original address are stored in a common storing element. The original address is hereby held in advance in the non-volatile storing element, for example an EEPROM, and the operational address allocated according to claim 13.

According to the invention there is alternatively the possibility of common storage of original addresses (according to advantageous further development, with characterising component or with separate characterising address) and operational addresses. Therefore in operation, one of these two addresses can be used for addressing and identification, depending on certain commands from the command generator. This is particularly advantageous when changing a selected operational address configuration or when putting the system into operation anew. If a characterising component or a separate characterising address according to claim 5 or 14 remains untouched in each receiver, the operational address can directly replace the original address according to claim 19. In the case of a common storing element for these two addresses, storing can be effected by overwriting the memory cell for the original address with the operational address.

Further advantageous implementations of the invention, here for example the control of the system via separate optical glass fibres or the inclusion of a dimmer switch part in each decentral receiver, are set forth in the subclaims.

The invention will now be described in more detail with reference to exemplary embodiments.

Figure 1:
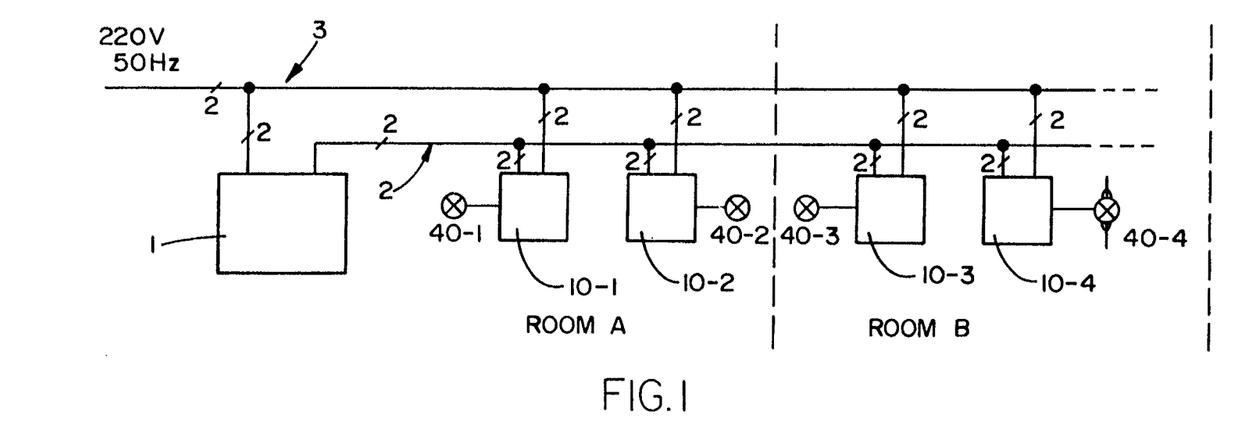
FIG. 1 shows a control system according to the invention with a command generator and four decentral receivers with associated appliances arranged in different rooms.

FIG. 1 shows a block circuit diagram of the system with a supply line 3 and a control line 2. A command generator 1 is connected to both the supply line 3 and the control line 2. Several electrical appliances 40-1, 40-2, 40-3 and 40-4 arranged in different rooms of a building are connected via respective receivers 10-1, 10-2, 10-3 and 10-4 to both the supply line 3 and the control line 2. Any electrical appliance may be used as an appliance. FIG. 1 shows, for example, lighting fittings 40-1, 40-2 and 40-3 which may, amongst other possibilities, be incandescent lamps or gas discharge lamps. An electric motor 40-4 can also be used as an electric appliance which, for example, controls a shutter or opens doors. The appliances shown are referred to below generally by the reference numeral 40; the receivers are likewise referred to generally by the reference numeral 10.

Figure 8:
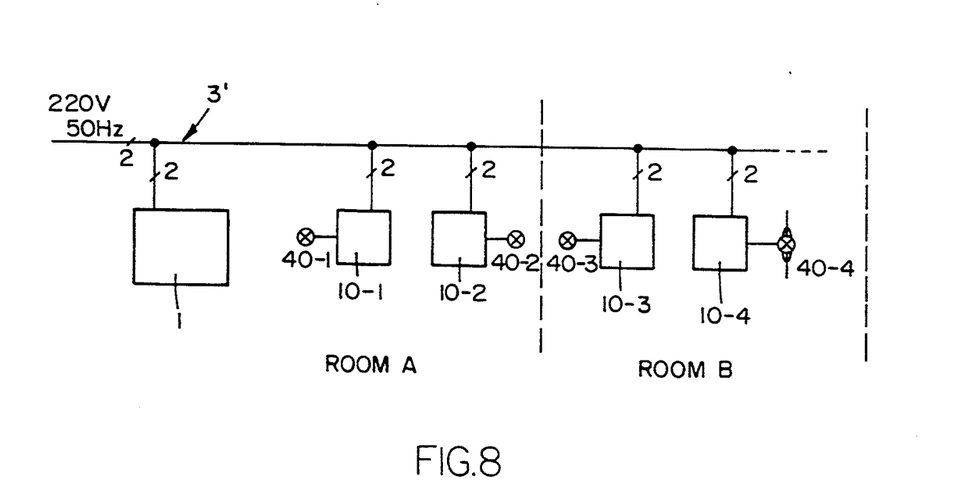
FIG. 8 shows a modification of the control system of FIG. 1, modified to illustrate a common supply/control line.

In a further exemplary embodiment of the invention, as illustrated in FIG. 8, the supply line and the control line are identical, illustrated as a common supply/control line 3', and control signals are transmitted at high frequency, for example by PCM or FM techniques, over the low-frequency (50 Hz) supply line. As a further modification according to the invention an optical light fiber cable can be used instead of the control line 2 that is lead either from a command generator 1 to a respective receiver 10 or is laid out as a ring. In the latter case all receivers are fed by and receive from the same control line. The receivers 10 or the appliances 40 connected thereto can be controlled without wires via a transmitter, for example an infrared or ultrasound transmitter, in the command generator 1. For this purpose several independent, in particular transportable, command generators can be used. The receivers 10 have supplementary receiver modules that can be connected to a relevant control part 30. If bidirectional operation is desired, i.e. the relevant control parts 30 are also intended to transmit addresses or data to the (or several) not fixedly installed command generator(s) 1, a supplementary receiver module and a supplementary transmitter module are to be provided in the command generator(s) 1 and the receiver(s) 10.

Both alternatives can also be realised in common; both the start-up (address allocation) from a fixed location command generator 1 and the regular operation (the control of the receivers 10) by the non-fixed command generator(s) 1. The supplementary receiver module for picking up the wireless radio/light control signals may also be arranged in a fixed location command generator 1. From here the wireless signals are converted into control signals which reach the receivers 10 via the control line 2 or via the supply line 3.

The operation of a control system shown in FIG. 1 is made possible in that an appliance-specific operational address is allocated to each receiver and thus to each appliance associated therewith. The command generator 1 is thereby in a position to control each individual appliance or, as will be described below, to control in unison individual groups or subgroups of appliances. The receivers 10 are in a position to both receive commands from the command generator 1 and to react to these commands by controlling the appliance addressed by the command generator 1 or—in response to special commands—send information back to the command generator 1 via the control line 2.

The appliance 40-1 that is controlled by the receiver 10-1 and to which one (or several parallel) address(es) A1-1 (see FIG. 3) is (are) associated, is located in a conventional light housing. For example the motor 40-4 and the associated receiver 10-4 are likewise located in a louvred housing. It can thus be seen that before installation individual device units can already be delivered locally, ready for operation, and be installed directly by semi-qualified staff. This simplified installation and simplified addressing of the individual lamps, to be described below, is of great importance in particular for ceiling light strips in open plan offices.

Figure 2:
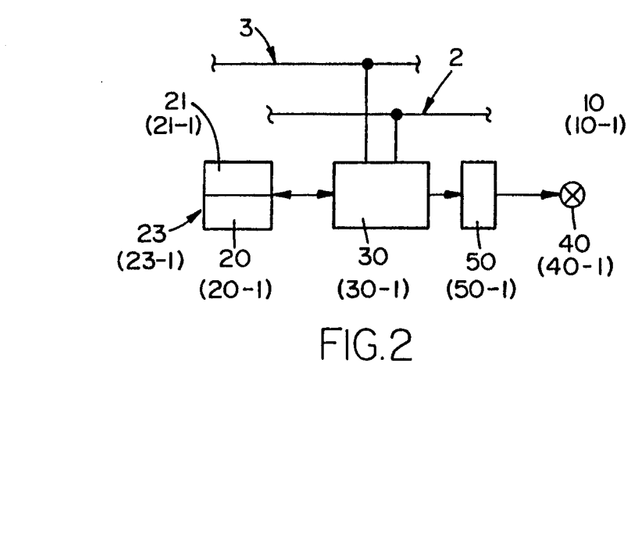
FIG. 2 shows a detailed block circuit diagram of a receiver with an associated appliance from FIG. 1.

FIG. 2 shows a detailed block circuit diagram of one of the receivers 10 shown in FIG. 1. Again the supply line 3 and the control line 2 can be seen which, as already described with reference to FIG. 1, may be combined in a common supply and control line. By way of example the receiver 10-1 with the associated appliance 40-1 will be described below. The receiver has a control part 30-1 that couples the control line 2 and supply line 3. This control part 30-1 (bus controller) has access to a memory 20-1 that contains data and addresses which identify this receiver 10-1. The bus controller 30-1 controls the associated appliance 40-1 by way of a control switch 50-1 that may be a relay, triac or dimmer switch. The modules or circuit parts: memory, bus controller, control switch and the associated appliance, that are particularly indicated in FIG. 2 are referred to in the following generally by the reference numerals 23, 30, 50 and 40 respectively, as they are provided in each connected module (see FIG. 1). Particular designation in the form of an added "—1" or "—2" is dispensed for the purpose of generalisation. Thus, for example, 30-3 indicates the bus controller of the receiver 10-3 and 40-4 indicates the appliance that is associated with the receiver 10-4. These elements are indicated generally by the reference numerals 30, 40 and 10.

The memory 23 is formed as a common memory element, i.e. a write and re-writable, non-volatile memory with a memory capacity of, for example, 2 kilobytes. It has a predetermined data width, for example 8 bits. Both the operational address and the original address for the relevant receiver are stored therein. However it is also possible to divide the memory into two separate memories of which the one part-memory 21 stores the original address and the second part-memory 20 stores the operational address. The original address, which as a rule consists of a digital word (8 bits or 6 bits), may also be formed by means of a mechanical (economical) memory element. In such a case setting by means of a particular switch configuration as well as optical checking of the setting would be possible at any time, during fabrication. The setting of, for example, a DIL switch with eight switch elements may be effected on the basis of the type of lamp mounted in the device unit. The set digital word can now be read by the control device 30 (bus controller) as well as the operational address to be written in parallel thereto in the second part memory 20.

Figure 3:
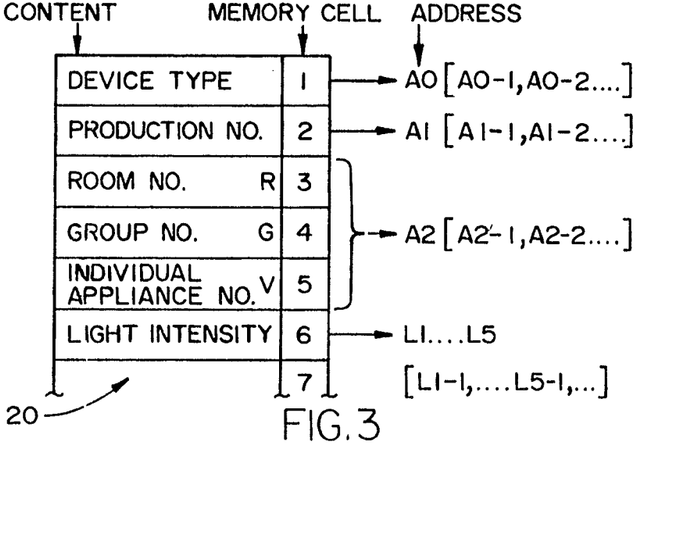
FIG. 3 shows, by way of example, the contents of memory cells in a memory of a receiver shown in FIG. 1 or FIG. 2.

FIG. 3 shows, by way of example, the contents of memory cells as they appear in a common memory 23 of a receiver 10. A plurality of addresses A0, A1, A2 and light intensity data L1 ... L5 are provided herewith. In the present case the characterising address A0 indicates the type of device and the original address A1 indicates an end-user specific production number. The combination of a room number R, a group number G and an individual appliance number V is used as the operational address A2. A predetermined number of fixed lighting levels, for example 5, may be preset and, if appropriate, be activated by way of short commands from the command generator 1. In the case of digital control these fixed lighting levels are selected from a given maximum number of lighting levels (in the case of 8 bits these are 256, in the case of 6 bits these are 64 lighting levels). For example L1 can switch on the emergency lighting and L2 a projection lighting etc. The fixed lighting levels may be preprogrammed in advance in the manufacture of the device units or receivers in accordance with the original addresses. The free selection of all (discrete) possible lighting levels (256, 64 ... ) is however equally possible in addition to the short command selection. To vary the light intensity a dimmer switch 50 is necessary in FIG. 2. A relay cannot fulfil this function.

The address designations A0, A1 and A2 apply in general to all receivers 10 and are found in their respective memories 23. The specific addresses of a receiver, for example of the receiver 10-3, are indicated by A0-3, A1-3 and A2-3. This system of designation is chosen in accordance with that of FIG. 2 and FIG. 1.

Before installing or mounting the individual receiver 10 with its relevant associated appliance 40, the address A0 (type of device, characterising address) and the address A1 (production number, original address) are already contained in the relevant memory 23. As a memory an EEPROM is preferably used, however any other type of memory can be used that makes long-term and modifiable storage possible (non-volatile memories). This is, for example, a battery-backed-up CMOS-RAM. The type of device A0 and the production number A1 are designated as characterising or original address, and the combination of room number R, group number G and individual appliance number V is designated as operational address A2. Before assembly the values in the memory cell(s) of the operational address are initially zero, i.e. R=0, G=0 and V=0.

The lighting system is put into operation (set in function) in that the command generator 1 sends a command to all receivers to disclose the relevant addresses. In the case of a newly installed system or in the case of a receiver with associated new appliances being added to an existing system, the receivers send their respective device type and production number, consequently the addresses A0 and/or A1.

The relevant bus controller 30 recognises them by the zero values of the system address A2. Those devices that have already been put into operation send their system address A2. The command generator 1, which first selects one address from the addresses sent by all the connected receivers, now groups or classifies the receiver 10.

Figure 6:
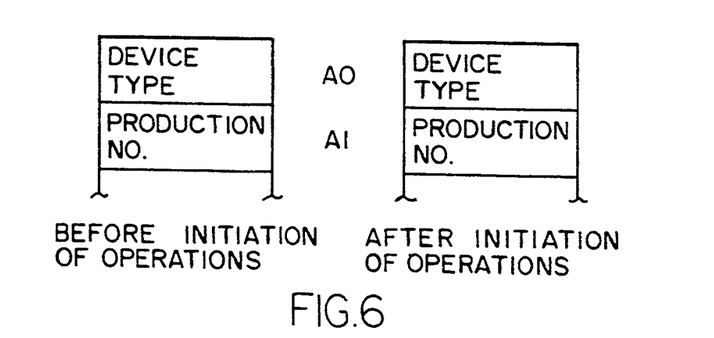
FIG. 6 shows, by way of example, the memory cells of a memory in a receiver according to the invention shown in FIG. 2 or in FIG. 5 before and after operation of the system shown in FIG. 1.

For receivers that do not yet have an operational address A2 the original address A1 (production number) is replaced by a corresponding operational address A2 (combination of R, G and V). This either occurs in that the values zero in the memory cells, which contain the room number R, the group number G and the individual appliance number V, are replaced by a number differing from zero (binary or hexadecimal data word) or in that the combination R-G-V of the room number R, the group number G and the individual appliance number V is stored in the memory cell for the production number (original address). In the second case the operational address A2 directly replaces the original address A1 while in the first case both addresses are stored next to one another in the memory 23. If there is an operational address A2 available the bus controller will, as a rule, select it and can refer to the production number (original address that may also be stored in a separate memory 21) only for special commands. The direct replacement of the production number by the R-G-V address is shown in FIG. 6 in that the corresponding memory content in FIG. 3 is shown once before initiation of operations and once after initiation of operations. The device type (characterising address A0) remains unaltered since the appliance has not changed and this address component is relatively short.

Figure 4:
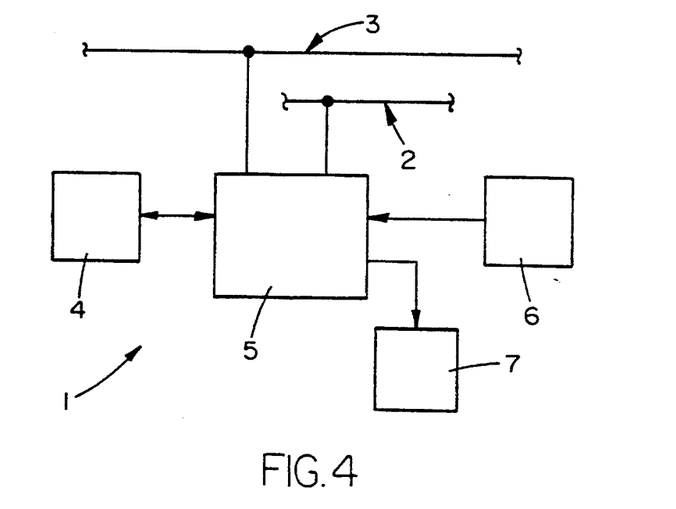
FIG. 4 shows a detailed block circuit diagram of a command generator according to the invention, as shown in FIG. 1.

FIG. 4 shows the detailed block circuit diagram of a command generator 1 shown in FIG. 1. It likewise has a control part 5 for coupling the supply line 3 and the control line 2. The control part 5 can be made up as a bus controller in the sameway as the bus controller 30 of each receiver. Since bus controllers as a general rule operate bidirectionally it is thus possible for the control lines of both bus controllers to be used in both directions. Connected to the bus controller 5 is a central memory 4 that can be made up in the same way as the memory 23 of each receiver. This memory 4, however, has a larger memory capacity as it contains information, i.e. data and addresses of all receivers 10 (appliances 40) connected to the system. The command generator 1 further has an operating and input switch part 6 with which commands and information can be supplied to the bus controller 5 and thus the system. A display device 7 (also called display) makes it possible to display system parameters such as addresses, connected appliance numbers, and light intensities or installed and operated overall power. Furthermore the user-specific allocation of operational addresses A2 can hereby be carried out in the form of group number G, room number R and individual appliance number with visual assistance via the display device.

The mirror image of the memory content shown in FIG. 3 of a memory 23 in a receiver 10 is found in the memory 4. After installation and initiation of operation the command generator 1 is informed of all connected appliances and knows their relevant device types, the production number and the operational addresses (R-G-V-addresses) associated therewith on installation. The command generator 1 is also informed of the fixed brightness steps or light intensities L1, . . . ,L5 that can be set by the receivers 10. Such a copy of the entire characteristic values of the installed system reduces the access times and avoids continuous bus interrogation via the control line 2 in case an operator would like to know the system parameters from the command generator 1 by way of the display 7.

Figure 5:
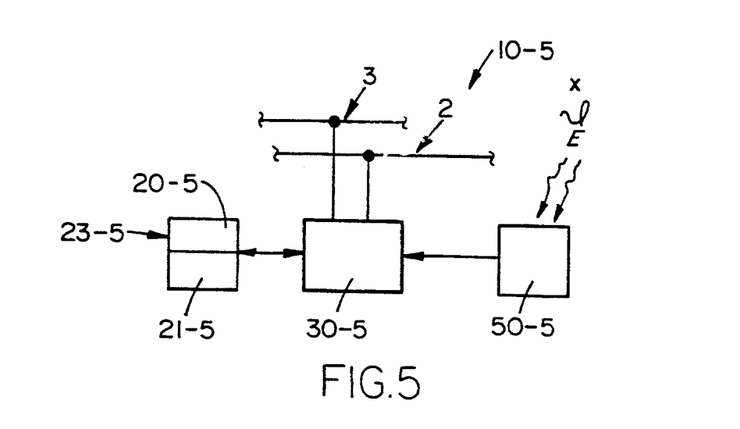
FIG. 5 shows a detailed block circuit diagram similar to FIG. 2, however a sensor part is associated with this receiver instead of an appliance.

FIG. 5 shows, by way of example, a receiver 10-5 that is used as a measuring means. It has a bus controller 30-5 and a memory 23-5 connected thereto. These two modules correspond to those of FIG. 2. Here a sensor 50-5 is used in place of the control switch 50-1 (dimmer switch) and the appliance 40-1 shown in FIG. 2, which informs the bus controller 30-5 of any locally measured value. The measured value may, for example, be brightness, temperature or any other important information significant to the command generator and the system. The connection of the bus controller 30-5 to the control system occurs via the same supply line 3 and the same control line 2. The measured values picked-up by the sensor 50-5 are thus made accessible to the command generator 1.

A method of bringing the described control system into operational condition will be described with reference to FIG. 7. The steps of the procedure are roughly outlined as follows:

1. Production and manufacture of the receivers 10 with associated appliances 40 and manufacture of already integrated combination devices which, along with the appliance 40, have a receiver 10 built into a common housing,
2. local mechanical and electrical installation,
3. test
4. allocation of an operational address (address R-G-V) to replace the original address A0, A1 (device type and production number) stored under point 1 in the memory 23 or 20 (in the case of separate part-memories) of the receiver 10 by the operational address A2 (R-G-V- address),
5. operation of the control system according to the invention.

The advantage of the method according to the invention lies firstly in the conversion from the original address to the operational address. For this, as already described, a common readable and writable memory 23 or a first memory is installed in each receiver which enables this conversion. A further substantial advantage when bringing the system into operation is that the allocation and/or the exchange of addresses is effected by a central command generator that can be connected at any desired locality to the control line and the supply line. Complicated installation work at devices or lighting fittings already mounted is thus avoided when the system is either put into operation for the first time or when the system is expanded or its grouping of appliances is changed. Light sources 40-1, 40-2, 40-3 and appliances 40-4 that are mounted at localities not easily accessible need no longer be dismounted. They remain at their locations as local access to these appliances is superfluous when bringing into operation and when re-adjusting a system according to the invention. Aside from the flexibility and the reduced outlay, the bringing into operation of the system according to the invention described above ensures a reduction in the danger of injury. This is because in order to bring the system into operation and possibly to later change a system already put into operation no-one need climb a ladder up to the appliances or lighting fittings. Furthermore no covers nor housings need be opened as a result of which the danger of electrical injuries is also removed directly and indirectly.

Under numeral 2 the installation of the system was mentioned; this comprises the initial mounting of appliances 40 and involves both mechanical and electrical installation. A test run or test operation follows; all devices are addressed by the command generator 1 and it is immediately recognisable whether individual devices are functional and connected correctly. Following the test phase the system is put into operation, which is summarized under numeral 3 and explained in a Pascal-like procedure in FIG. 7. The symbols in triangular brackets denote digital binary signals of, for example, 8 bits that are sent and received either electrically or optically via the control line 2 or by high frequency via the supply line 3 from and to the receivers 10 and the command generator 1 when the system is in operation and is being brought into operation. Thus <identify> denotes one (or more) multidigital binary words which can clearly be differentiated from other binary words and thus be interpreted correctly as a command by the receivers. It is hereby ensured that, for example, <production number> can be directly and clearly differentiated from, for example, the command <switch on>. At first the command from the command generator 1 goes to <all> appliances for them to <identify> themselves by disclosing their addresses. The appliances which have already been allocated an operational address A2 in a previous process for initiation of operation send this address. The appliances that are new to the system send their production number and/or identification which characterises the relevant appliance 40 or its device type. The relevant bus controller 30 determines which address is to be sent. The command generator 1 receives via a similar bus controller 5 the first arriving <production number> and by means of an appropriate command to the just received <production number> switches this lamp <bright> or the appliance <on>. This is shown in FIG. 7 under point 3. Step 2 in FIG. 7 only shows the arrival of one <production number> of one receiver. The other <production numbers> that were sent simultaneously or shortly thereafter are first ignored. They are processed successively in steps 6, 7, etc. This means that an appliance with receiver continues to send the <production number> until it receives the switch on command described under point 3. The relevant bus controller 30 or 5 synchronises and checks whether a command or identification can be switched to or sent on the control line 2.

Based on a predetermined plan, an operational address A2 is now selected of which the selected appliance 40 is informed by the command generator 1. This operational address comprises a combination of groups, subgroups and individual appliances. One possible grouping would, for example, be one that is subdivided into room number R, group number G and individual appliance number V so that, by means of a single command, a plurality of appliances of a common group can be addressed simultaneously. In this way a single command can switch on (make bright) or switch off all appliances (lighting fittings) in a room. The group number G denotes a subgroup of the room R, for example lighting for individual table groups or desks; the individual appliance number V finally allows each individual appliance to be addressed individually. Another possible grouping would, for example, be according to the floor, room and individual appliance, with which it would be possible to switch on and off the lighting of a whole floor with one command and to control the lighting or appliances in individual rooms. Grouping according to floor, or room or group is not restricted to rooms or buildings, for example individual paths or driveways to buildings and the lighting of buildings can be combined to form a group and addressed simultaneously. With this system a once selected hierarchy can be altered as desired many times.

Figure 7:
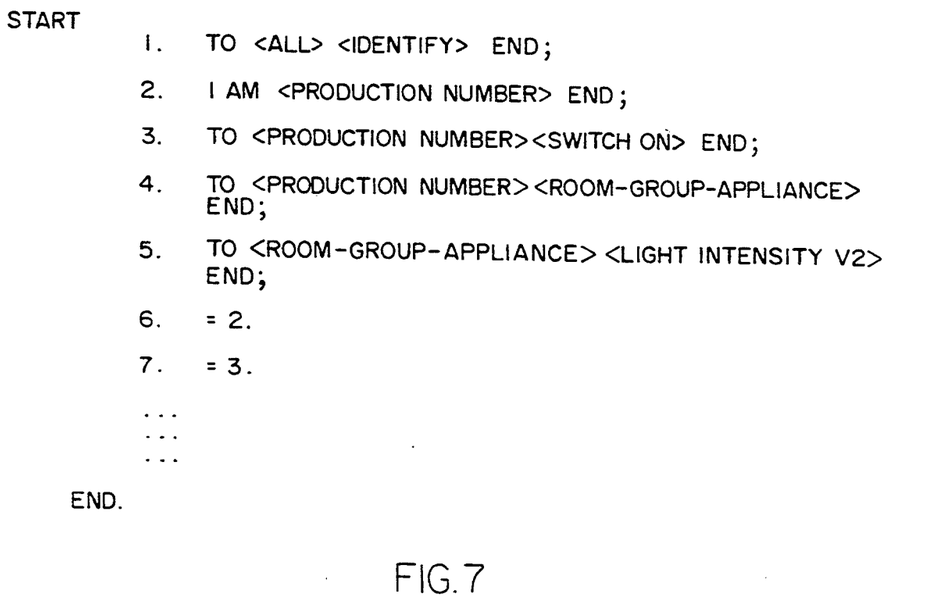
FIG. 7 shows, by way of example, in a pascal-like notation a procedure for putting into operation a control system as shown in FIG. 1.

Apart from the allocation of an operational address in the form of the hierarchial room/group/individual appliance address (R-G-V-address), as is effected under point 4 in FIG. 7, different fixed light intensities can be allocated to each appliance. A maximum number of brightness steps (8 bits correspond to 250 steps) predetermined by the digital word width, as well as different speeds of rotation or position values of drives, can be brought into operation independently thereof. The allocated fixed brightness steps can be called-up later by short commands and can be altered as desired. If original fixed light intensity values or predetermined power levels L1, L2 . . . L5 are also stored in the system with the original addresses, not only is the selection between switching on and switching off possible after assembly of the appliance to the system with the control device but also the advance setting of several brightness steps.

In the steps 6, 7,ff. in FIG. 7 the control signals or command sequences itemized under points 2 to 5 are administered until all receivers are allocated an operational address and if appropriate new fixed light intensities. In step 5 only the allocation of a <light intensity V2> is shown, however, it is also possible to allocate several fixed light intensities successively so that, when appropriate, different brightness steps can be set by command from the command generator at the appropriate time. The dimmers or similar switching circuits 50 needed for this are each located in the relevant receiver 10 or in the appliance 40.

The possibility of addressing individual groups, rooms or floors by means of general commands has already been explained. This is likewise possible with the provision of corresponding storage capacity in the memory 4 of the command generator even if no operational addresses are given. The command generator 1 must establish individual groups in terms of their relevant production number (original address) and, with a group con, hand or general con, hand that is intended to address one of these groups which is established (make recognisable) as a group in the memory 4, control successively each individual appliance by means of its relevant original address. This is indeed possible but impractical and time consuming. This requires high transfer rates which on the one hand make the system more expensive and on the other hand increase fault liability. The selection of short, hierarchial operational addresses is particularly advantageous.

It must be noted that the representation of five fixed light intensities L1 ... L5 is only an example and that any number of fixed light intensities or fixed appliance performance levels can be used and predetermined.

I claim:

1. A control system for a plurality of appliances in distributed arrangement, in particular lighting fittings, comprising one or several command generators,
a receiver associated with each appliance,
a control line which connects the command generator to each receiver,
a first memory in each receiver into which an operational address for the associated appliance can be written by electrical signals, and
a control part provided in each receiver by means of which the appliance associated therewith can be controlled by the command generator if they have been previously activated by selection of the operational address of the appliance associated therewith, characterized in that provided in each receiver is an electrically readable second memory that contains a receiver-specific original address, and the original address comprises a production number, and
a sensor part is associated with each receiver which measures a local measured value of a physical property, as brightness or temperature, and in that the detected measured value is communicated by way of the control part provided in the receiver on command of the command generator to the command generator via the control line.

2. A control system for a plurality of appliances in distributed arrangement, in particular lighting fittings, comprising one or several command generators,
a receiver associated with each appliance,
a control line which connects the command generator to each receiver,
a first memory in each receiver into which an operational address for the associated appliance can be written by electrical signals, and
a control part provided in each receiver by means of which the appliance associated therewith can be controlled by the command generator if they have been previously activated by selection of the operational address of the appliance associated therewith, characterized in that provided in each receiver is an electrically readable second memory that contains a receiver-specific original address, and the original address comprises a production number, and
the control line comprises optically conductive material and the command generator controls the connected receivers by way of bidirectional optical control signals, or in that the connected receivers can be controlled bidirectionally or unidirectionally via infrared signals from one or more command generators, in particular portable or mobile command generators.

3. A method for putting into operation a control system for a plurality of appliances in distributed arrangement, in particular lighting fittings, comprising one or several command generators,
a receiver associated with each appliance,
a control line which connects the command generator to each receiver,
a first memory in each receiver into which an operational address for the associated appliance can be written by electrical signals,
a control part provided in each receiver by means of which the appliance associated therewith can be controlled by the command generator if they have been previously activated by selection of the operational address of the appliance associated therewith, wherein an electrically readable second memory is provided in each receiver that contains a receiver-specific original address, and the original address comprises a production number, said method comprising, a) storing before installation of the system the receiver-specific original address in the second memory of each receiver,
b) instructing, after the system has been installed, via the control line by means of the command generator, the receivers of all appliances to transmit their receiver-specific original addresses,
c) selecting by means of the command generator one of the transmitted original addresses and instructing the appliance associated with this address to identify itself,
d) storing an operational address which, after installation of the system, takes account of a specific grouping and/or arrangement of appliances in different rooms, in the first memory of the receiver associated with the identified appliance by means of the command generator,
e) repeating the steps b) to d) until all operational addresses are written in the corresponding first memories, and
f) wherein according to step b) the receivers which send their original addresses do not yet have an operational address, and in that the receivers which have already been allocated an operational address in previous initiation of operations send this operational address instead of the original address.

4. A method for putting into operation a control system for a plurality of appliances in distributed arrangement, in particular lighting fittings, comprising one or several command generators,
a receiver associated with each appliance,
a control line which connects the command generator to each receiver,
a first memory in each receiver into which an operational address for the associated appliance can be written by electrical signals,
a control part provided in each receiver by means of which the appliance associated therewith can be controlled by the command generator if they have been previously activated by selection of the operational address of the appliance associated therewith, wherein an electrically readable second memory is provided in each receiver that contains a receiver-specific original address, and the original address comprises a production number, said method comprising, a) storing before installation of the system the receiver-specific original address in the second memory of each receiver,
b) instructing, after the system has been installed, via the control line by means of the command generator, the receivers of all appliances to transmit their receiver-specific original addresses, c) selecting by means of the command generator one of the transmitted original addresses and instructing the appliance associated with this address to identify itself, d) storing an operational address which, after installation of the system, takes account of a specific grouping and/or arrangement of appliances in different rooms, in the first memory of the receiver associated with the identified appliance by means of the command generator, e) repeating the steps b) to d) until all operational addresses are written in the corresponding first memories, and f) wherein the operational address directly replaces the original address, while a characterizing address for denoting the type of appliance, in particular the type of lighting fitting, remains unchanged.

5. A method for putting into operation a control system for a plurality of appliances in distributed arrangement, in particular lighting fittings, comprising one or several command generators, a receiver associated with each appliance, a control line which connects the command generator to each receiver, a first memory in each receiver into which an operational address for the associated appliance can be written by electrical signals, a control part provided in each receiver by means of which the appliance associated therewith can be controlled by the command generator if they have been previously activated by selection of the operational address of the appliance associated therewith, wherein an electrically readable second memory is provided in each receiver that contains a receiver-specific original address, and the original address comprises a production number, said method comprising, a) storing before installation of the system the receiver-specific original address in the second memory of each receiver, b) instructing, after the system has been installed, via the control line by means of the command generator, the receivers of all appliances to transmit their receiver-specific original addresses, c) selecting by means of the command generator one of the transmitted original addresses and instructing the appliance associated with this address to identify itself, d) storing an operational address which, after installation of the system, takes account of a specific grouping and/or arrangement of appliances in different rooms, in the first memory of the receiver associated with the identified appliance by means of the command generator, e) repeating the steps b) to d) until all operational addresses are written in the corresponding first memories, and f) wherein on the basis of a command from the command generator, each control part decides which of the two addresses is to be selected.

* * * * *